United States Patent [19]
Haartsen

[11] Patent Number: 5,884,145
[45] Date of Patent: Mar. 16, 1999

[54] METHOD AND SYSTEM FOR AUTONOMOUSLY ALLOCATING A CELLULAR COMMUNICATIONS CHANNEL FOR COMMUNICATION BETWEEN A CELLULAR TERMINAL AND A TELEPHONE BASE STATION

[75] Inventor: Jacobus C. Haartsen, Staffanstorp, Sweden

[73] Assignee: Telefon Akmebolget LM Ericsson, Stockholm, Sweden

[21] Appl. No.: 704,846

[22] Filed: Aug. 28, 1996

[51] Int. Cl.[6] .............................. H04B 1/10; H04B 15/00

[52] U.S. Cl. .......................... 455/63; 455/444; 455/450; 455/513

[58] Field of Search ................ 455/33.1, 33.2, 455/34.1, 34.2, 54.1, 56.1, 62, 63, 67.1, 33.4, 422, 444, 450, 452, 451, 455, 454, 464, 509, 426, 434, 437, 513

[56] References Cited

U.S. PATENT DOCUMENTS

| | | | |
|---|---|---|---|
| 5,109,528 | 4/1992 | Uddenfeldt | 455/33.2 |
| 5,193,101 | 3/1993 | McDonald et al. | 455/33.4 |
| 5,197,093 | 3/1993 | Knuth et al. | 455/161.1 |
| 5,203,012 | 4/1993 | Patsiokas et al. | 455/513 |
| 5,212,805 | 5/1993 | Comroe et al. | 455/33.4 |
| 5,247,701 | 9/1993 | Comroe et al. | 455/33.1 |
| 5,301,188 | 4/1994 | Kotzin et al. | 370/330 |
| 5,428,668 | 6/1995 | Dent et al. | 379/59 |
| 5,448,750 | 9/1995 | Eriksson et al. | 455/34.1 |
| 5,448,754 | 9/1995 | Ho et al. | 455/34.1 |
| 5,455,821 | 10/1995 | Schaeffer et al. . | |
| 5,497,505 | 3/1996 | Koohgoli et al. | 455/34.1 |
| 5,507,034 | 4/1996 | Bodin et al. | 455/452 |
| 5,524,280 | 6/1996 | Douthitt et al. | 455/62 |
| 5,526,402 | 6/1996 | Dent et al. | 379/59 |
| 5,535,259 | 7/1996 | Dent et al. | 379/59 |
| 5,537,434 | 7/1996 | Persson et al. | 375/202 |
| 5,539,730 | 7/1996 | Dent . | |
| 5,548,807 | 8/1996 | Ueda | 455/509 |
| 5,559,866 | 9/1996 | O'Neill | 455/33.3 |
| 5,570,352 | 10/1996 | Pöyhonenö | 370/330 |
| 5,581,548 | 12/1996 | Ugland et al. | 370/330 |
| 5,594,720 | 1/1997 | Papadopoulos et al. | 370/337 |
| 5,594,949 | 1/1997 | Andersson et al. | 455/62 |
| 5,603,085 | 2/1997 | Shedlo | 455/450 |
| 5,606,727 | 2/1997 | Ueda | 455/62 |

FOREIGN PATENT DOCUMENTS 2 269 298A  7/1992  United Kingdom .

*Primary Examiner*—William A. Cuchlinski, Jr.
*Assistant Examiner*—Gertrude Arthur
*Attorney, Agent, or Firm*—Jenkens & Gilchrist

[57] ABSTRACT

An allocation method and system for allocating a least-interference communications channel between a cellular system and a private radio system within the cellular system. A set of candidate channels are first selected and ordered by the amount of interference present within the cellular system, and a subset thereof is selected. A second set of candidate channels are then selected from the subset and ordered by the amount of interference present in the private radio system environment, and a safe channel subset thereof is selected. That channel exhibiting the least amount of interference is then selected from the safe channel subset as the communications channel.

61 Claims, 5 Drawing Sheets

| AFA candidate list | | ordered DCS candidate list | | | | preferred traffic list | |
|---|---|---|---|---|---|---|---|
| ARFCN | averaging measurements | ARFCN | TN | RXLEV | | ARFCN | time slot |
| 5 | | 5 | 7 | −120dBm | | 5 | 7 |
| 10 | frequency & slot | 10 | 7 | −120 | select 6 best channels | 10 | 7 |
| 4 | | 5 | 2 | −117 | | 5 | 2 |
| 2 | | 5 | 4 | −116 | | 5 | 4 |
| | 40 | 10 | 6 | −116 | | 10 | 6 |
| | | 10 | 1 | −114 | | 10 | 1 |
| | | 5 | 5 | −114 | | | 44 |
| | | ⋮ | ⋮ | ⋮ | | | |
| | | 4 | 4 | −110 | | | |
| | | 2 | 4 | −109 | | | |
| | | 2 | 7 | −104 | | | |
| | | | 42 | | | | |

METHOD AND SYSTEM FOR AUTONOMOUSLY ALLOCATING A CELLULAR COMMUNICATIONS CHANNEL FOR COMMUNICATION BETWEEN A CELLULAR TERMINAL AND A TELEPHONE BASE STATION

FIELD OF THE INVENTION

The present invention relates generally to private radio communication systems, which typically cover local indoor residential or business areas. Particularly, the present invention relates to radio communication systems which employ an air-interface compatible to an existing cellular digital Time-Division Multiple Access (TDMA) standard like the Global System for Mobile Communication (GSM) or the Digital Advanced Mobile Telephone Service (D-AMPS). More particularly, the present invention relates to automatic frequency allocation in such private radio systems to avoid interference with a cellular network sharing the same frequencies, and methods and communication systems to effectuate the same.

BACKGROUND OF THE INVENTION

The past decades have seen a considerable rise in the deployment of mobile telephony. After the slow start of analog standards like AMPS, Nordic Mobile Telephone (NMT) and the Total Access Communication System (TACS), mobile telephony has recently become quite popular in the consumer markets with products employing advanced digital standards like GSM and D-AMPS. In addition to other developments in mobile phone features, like smaller size and longer battery life, much progress has been made at the network side as well, particularly, in frequency reuse schemes to avoid co-channel interference between adjacent cells. Increasingly, dense cell reuse plans have been complemented with hierarchical cell structures, where macrocells cover entire districts, microcells cover smaller parts like streets, and picocells cover very small areas the size of a few rooms. Important for the hierarchical cell structure is that all the base stations deployed (ranging from macro to pico base stations) are part of the same public land mobile network (PLMN).

In order to avoid co-channel interference between different radio links, a structured channel allocation scheme is applied. Within a cell, the cellular base station makes sure that connections to different mobile stations are carried over different carrier frequencies and/or different timeslots. In order to suppress co-channel interference from surrounding cells, a frequency reuse scheme is applied in which the cellular operator plans the frequencies such that adjacent cells do not use the same frequency set. For example, in conventional AMPS systems, a 7-site/21-sector reuse methodology (7/21) is applied, which means that in a cluster of 21 sectors, all of the applied frequencies therein are unique. In modern cellular digital systems, however, more dense reuse schemes are applied, like a 4/12 or even a 3/9.

Recently, private networks for residential and business areas have been developed, which although using the same air-interface and the same spectrum as the cellular system, are not integrated with the overlaying public cellular network. In this sense, these private systems cannot be considered as micro or pico networks since there is no direct connection between these private systems and the cellular system. For example, for residential usage, private base stations can be used as described in either U.S. Pat. Nos. 5,428,668 or 5,526,402 which only connect to a Public Switching Telephone Network (PSTN).

If, however, such a private radio communication system is placed into an area covered by the cellular system with which the private system has to share frequencies, a problem arises since the private base stations are not coordinated with the cellular network. Therefore, they are not incorporated into the frequency reuse plan of the cellular network. Moreover, they are not coordinated among themselves. Accordingly, a method is needed which both prevents the private radio system from interfering with the overlaying cellular system, and which also prevents interference among different private radio systems covering the same area. A recent patent application of the assignee, of which the present inventor is a co-inventor, entitled "Methods and Systems for Allocating a Cellular Communications Channel for Communication between a Cellular Terminal and a Telephone Base Station Using Received Signal Strength Measurements," Ser. No. 08/517,710, filed Aug. 21, 1995, describes a method in which downlink measurements on control channels performed within the mobile station are sent to a cellular-operator-controlled server in the fixed network, which subsequently allocates to the private telephone base station a set of traffic channels corresponding to the control channel with the lowest received signal strength. This method, however, requires a correlation between the cellular traffic channels and the cellular control channels, a correlation function which must be present in the database of the server. In addition, replanning a cellular network again requires the interaction of the operator's server.

It is therefore an object of the present invention to provide a method and system in which channel allocation occurs in the private base station automatically to avoid interference situations.

It is a further object of the present invention that the method and system be adaptive, in that if the cellular network is replanned, the private network will automatically replan as well in order to avoid interference conditions.

It is another object of the present invention to provide a method and system which allow a private radio system within a larger cellular network to autonomously determine those frequencies it can use with minimal disturbance to and from the overlaying cellular system.

SUMMARY OF THE INVENTION

The present invention advantageously provides a method and communication system in which a private radio communication system which shares frequencies with the overlaying cellular system automatically selects channels that prevent interference with this existing overlaying cellular system. In addition, the method and communication system will prevent interference with other, nearby private radio communication systems also sharing the frequencies. The method uses downlink and uplink received signal strength measurements on allowed channels of the cellular and private communications systems. The signal strength measurements are carried out by the private base station or by the mobile station when in idle and traffic modes. The results of the measurements done in the mobile station are then transferred to the private base station where a procedure is carried out to determine the best available channel to use.

The method in the communication system of the present invention is divided into two steps. The first step is a slow adaption method which determines an initial set of eligible channels. Each channel in this initial set can be used as a traffic channel in the private radio communications with minimal disturbance to communications within the overlaying cellular system. The selection of this initial set is based on long-time averaging over many measurements carried out in the private base station or in the mobile station during idle mode. If a digital communication system is used based on a Frequency Division Multiple Access/TDMA or FDMA/TDMA, this initial set will only provide the frequency carriers to use. The method practiced in this first step is therefore referred to as an Adaptive Frequency Allocation (AFA) method.

The second step is a fast adaption method that responds to instantaneous interference measured during the traffic mode, and dynamically selects a second set of channels based upon the instantaneous interference experienced. This method, referred to as a Dynamic Channel Selection (DCS) method or algorithm, is only used during the traffic mode. The DCS method uses the initial channel set, as derived by the AFA method, as input, and selects a subset thereof and a particular traffic channel therein as the channel that is currently least interfered. If during the call the selected channel experiences interference, then another channel out of the subset is selected by the DCS method.

The combination of the long-term AFA algorithm and the short-term DCS algorithm provides an improved method to prevent interference not only between the private radio network and the cellular network, but also to prevent interference between two overlapping private radio networks sharing the same spectrum. Whereas the AFA algorithm adapts automatically to changes in the cellular network, the DCS algorithm adapts automatically to changes in the private radio environment.

A more complete appreciation of the present invention and the scope thereof can be obtained from the accompanying drawings which are briefly summarized below, the following detailed description of the presently-preferred embodiments of the invention, and the appended claims.

DETAILED DESCRIPTION OF THE PRESENT INVENTION

The present invention will now be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art.

Figure 1:
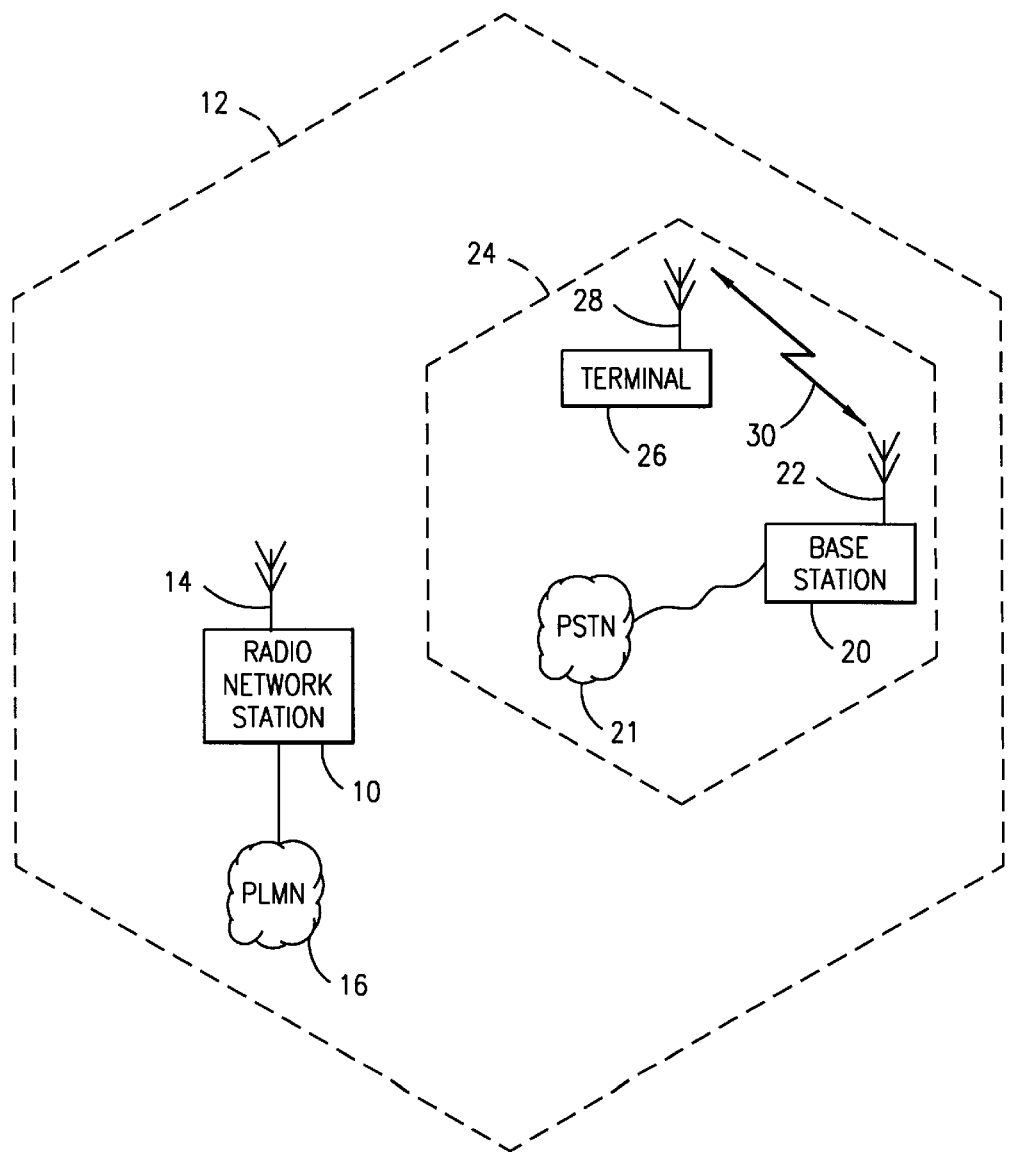
FIG. 1 is a schematic illustration of a private radio communication system within a cell of a cellular network, the private radio system including a base station and a cellular terminal, with radio communications between the terminal and the base station.
Figure 2:
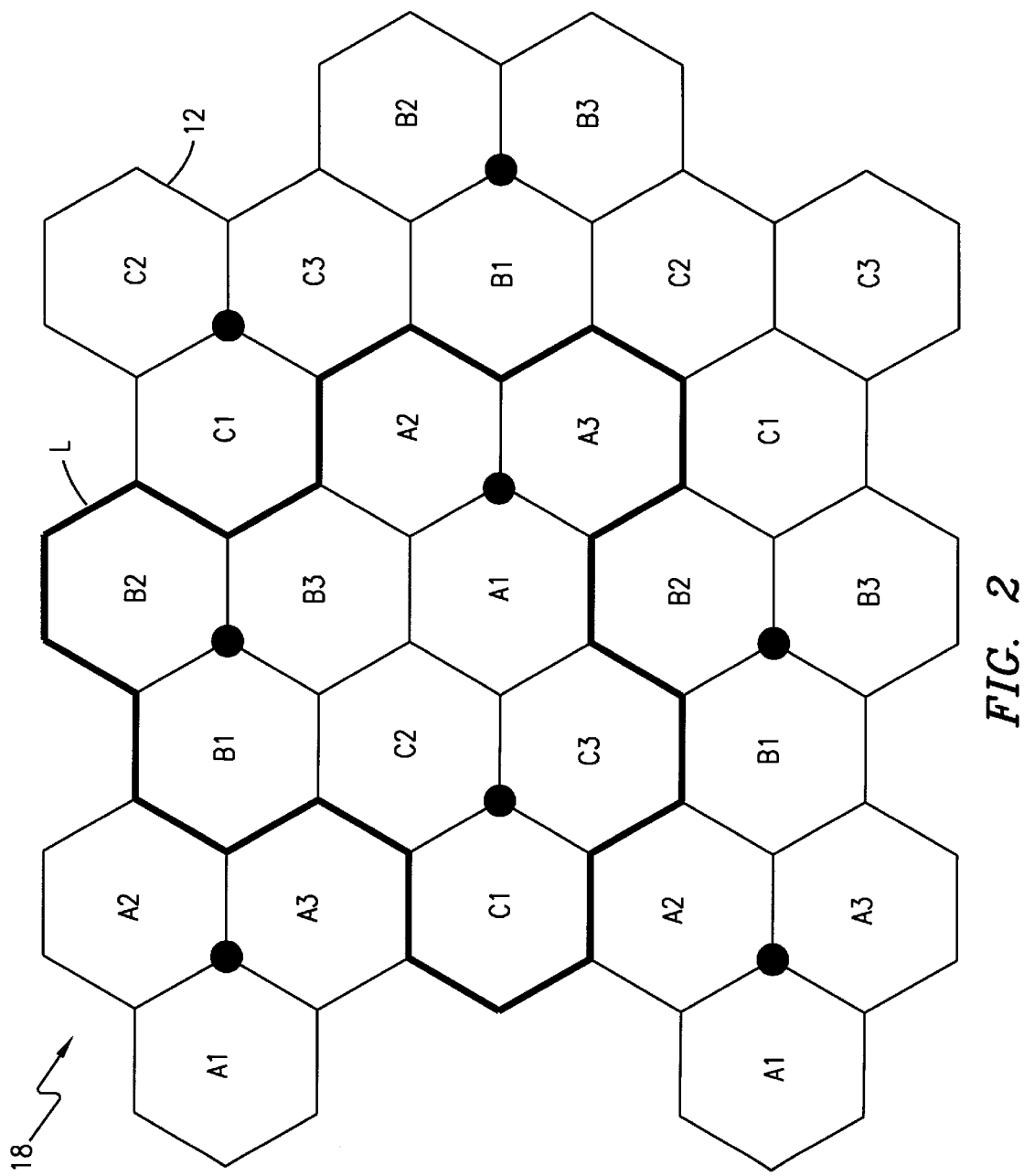
FIG. 2 is a schematic illustration of a 3/9 reuse pattern for a wide area cellular network.

Referring now to FIG. 1, a conceptual diagram of a private radio communications system according to the present invention is shown. Such a system operates within a cellular communications network which allocates portions of a plurality of frequencies within a spectrum to separate geographic cells. Thus, the network encompasses a wide area wireless communications network having the capacity to provide high quality wireless communications to a large number of users with a limited number of frequencies allocated to the wide area cellular network. As shown in FIG. 1, a wide area cellular network includes at least one radio network cell station 10, such as a cellular telephone cell station, for transmitting and receiving messages in a network cell range indicated by 12, via cell antenna 14. The range 12 of radio network cell station 10 is typically represented graphically as a hexagon, as illustrated in FIGS. 1 and 2. Radio network cell station 10 also interfaces with a Public Land Mobile Network (PLMN) 16.

It will be understood by those having skill in the art that a wide area cellular network 18 typically includes many radio network cell stations 10 to cover a large area, as illustrated in FIG. 2. In such a system, each radio network cell station 10 covers a cell (range) 12 within the wide area cellular network 18 and may interface with Base Station Controllers (BSCs, not shown) and Mobile Switching Centers (MSCs, not shown). The MSC may provide the connection to the PLMN 16 for all of the network cell stations 10 that make up the wide area cellular network 18.

With further reference to FIG. 1, one or more private or personal telephone base stations 20 are located within the cell (range) 12 of the network cell station 10 of the wide area cellular system or network 18. Base station 20 includes a low power transceiver for transmitting and receiving signals via base station antenna 22, over a limited base station range 24, typically on the order of tens of meters. Thus, a base station may be used for transmission and receipt of private radio communications in a home or office. Base station 20 is electrically connected to a wire network 21, such as the Public Switched Telephone Network (PSTN). PSTN 21 is the regular "wire line" telephone system supplied by, for example, the regional Bell Operating Companies, and may use copper wire, optical fiber or other stationary transmission channels. Base station 20 may be wired directly to the PSTN 21 or connected to a Public Access Branch Exchange or PABX (not shown).

Still referring to FIG. 1, a mobile terminal 26 is shown for radio communications with both base station 20 and radio network cell station 10 via an antenna 28 using basically the same air-interface and the same spectrum. Terminal 26 includes a radio telephone such as a cellular phone. Terminal 26 may also include, for example, a full computer keyboard and display, a scanner, and have full graphics and multimedia capabilities. As illustrated in FIG. 1, when terminal 26 is in the range 24 of the base station 20, terminal 26 attaches to base station 20 and a radio link 30 may be established.

It will be understood by those having skill in the art that a complete private radio communications system, referenced herein for convenience by the numeral 24, will typically include a private base station 20 and a plurality of terminals 26. It will also be understood by those having skill in the art that conventional communications and handoff protocols may be used with the present invention, and need not be described further herein.

Today's wide area cellular networks, such as network 18 in FIG. 2, utilize cell reuse methodologies in order to reduce co-channel interference. Cell reuse guarantees that a channel used in one cell, such as cell (range) 12, is not reused in a cell nearby but only in cells at a sufficient distance away to avoid interference problems. In particular, the interfering signals experience a propagation loss sufficiently large such that with respect to the received (carrier) level of the desired signal, the resulting carrier-to-interference ratio in the considered cell is high enough for acceptable radio operation. Cell reuse provides the capability to cover large areas with only a limited amount of frequency spectrum.

An example of a cellular reuse pattern is illustrated with reference to FIG. 2, which depicts a 3-site/9-sector reuse plan within the network 18. This means that in a cluster L of nine sectors (indicated by the thick line) containing sectors A1, A2, A3, and B1, B2, B3, and C1, C2, C3, all frequencies are unique. Conventionally, the frequencies start to be reused in a structured manner outside the cluster L. The frequency planning is fixed in most cellular systems, but can be somewhat adaptive in more advanced cellular systems. In the latter case, the system can slowly adapt to changes in the network and can therefore be considered semi-fixed.

As discussed, private or personal communications systems 24, such as those serviced by base station 20, have been described and developed that make use of the same frequency spectrum as the cellular system. In this way, a cellular terminal 26 can access a personal base station 20 without the need for modifications in the radio hardware design. These private base stations 20 provide a direct connection between the cellular terminal 26 and the PSTN 21 without the interaction of an overlaying cellular system or a cellular operator, such as at the radio network station 10. However, this also means that these private base stations 20 are not controlled by the cellular operator and thus are not integrated into the cellular system 18.

It should be understood, therefore, that since there is no coordination between the overlaying cellular system 18 and the private base stations 20 therein, the private systems 24 cannot be part of the reuse scheme employed in the cellular system. Consequently, problems of co-channel interference result since the private base stations 20 can use the same frequencies as the cellular system even though not being a part of the cellular reuse plan. In addition, private base stations 20, even though being in close proximity to each other, have no direct communication with each other, which is also a cause for co-channel interference between different and adjacent private radio systems 24.

As discussed in the aforementioned U.S. Pat. Nos. 5,428, 668 and 5,526,402 and in U.S. patent application Ser. No. 08/517,710, a private radio system overlaid by a cellular system should not use those frequencies used by the cellular system in the cell (or in adjacent cells) where the private radio system is located. However, unlike a conventional reuse pattern described in connection with FIG. 2 where all frequencies within the cluster L are unique, frequencies used in distant cells within the cluster L may be reused, provided the frequencies used in the distant cells within the cluster L and in the neighboring cells of contiguous clusters are unique.

For example, if a private radio system 24, i.e., base station 20 and terminal 26 in FIG. 1, is located in cell A1, i.e., cell (range) 12, in a cellular system 18 with a 3/9 reuse scheme, as illustrated in FIG. 2, the private radio system 24 should not use those frequencies in cell A1 or in contiguous cells A2, A3 or B2 (in a contiguous cluster), B3 or C2, C3. Rather, those frequencies in the more distant, non-contiguous cells B1 and C1 within cluster L would be used, since those frequencies would produce the least amount of co-channel interference to the private radio system 24 and vice versa. Accordingly, private radio systems 24 located in cell A1 would preferably choose radio frequencies for reuse from a set of frequencies formed from the set of frequencies used in distant cells B1 and C1. Although the experienced interference from cells B1 and C1 is higher than interference from corresponding A1 cells outside the cluster (which are the normal co-channel cells for cell A1), because of the small distance between the mobile terminal 26 and the private base station 20 and thus higher received carrier power, still an acceptable carrier-to-interference ratio can be obtained in the private radio system 24.

The present invention is, accordingly, directed to a method, and associated communications system, for obtaining an optimal set of frequency reuse channels for the private radio system 24. The method obtains the optimal frequency set automatically by using uplink and downlink measurements only. In the event the cellular reuse plan changes (because the cellular system operators reorganize the reuse pattern frequently), the set of frequencies ascertained applicable for the private radio systems 24 by the method of the present invention should automatically adapt accordingly. In this sense, an Adaptive Frequency Allocation (AFA) algorithm is required.

It should be understood that measurements are taken in the downlink and the uplink on all the frequencies the private radio system 24, is allowed to work on. A generic list of allowable frequencies is provided to the private base station 20 either at the time of manufacturing or by a wire or wireless (with the mobile station 26 as a possible intermediary) communication between the cellular operator and the private base station. The communication between the operator and the private base station 20 can be implemented either wireless via the cellular interface, or over the wire via the PSTN 21 interface. In both cases, a service number, e.g., an 800 number will be called that connects the mobile station 26 or the base station 20 to a service center of the operator. The generic list of frequencies can then be downloaded via Short Message Service (SMS) or via a data channel into the mobile terminal 26 or the private base station 20. This initial, generic list preferably includes all the frequencies the operator is allowed to operate on. Alternatively, the list may be restricted to those frequencies the operator allows the private radio systems 24 to operate on. In any event, the frequencies are preferably expressed in Absolute Radio Frequency Channel Numbers (ARFCN) which uniquely identify the frequencies in the cellular spectrum. An example of a generic list 36 containing candidate ARFCN frequencies is shown in FIG. 3.

Figure 3:
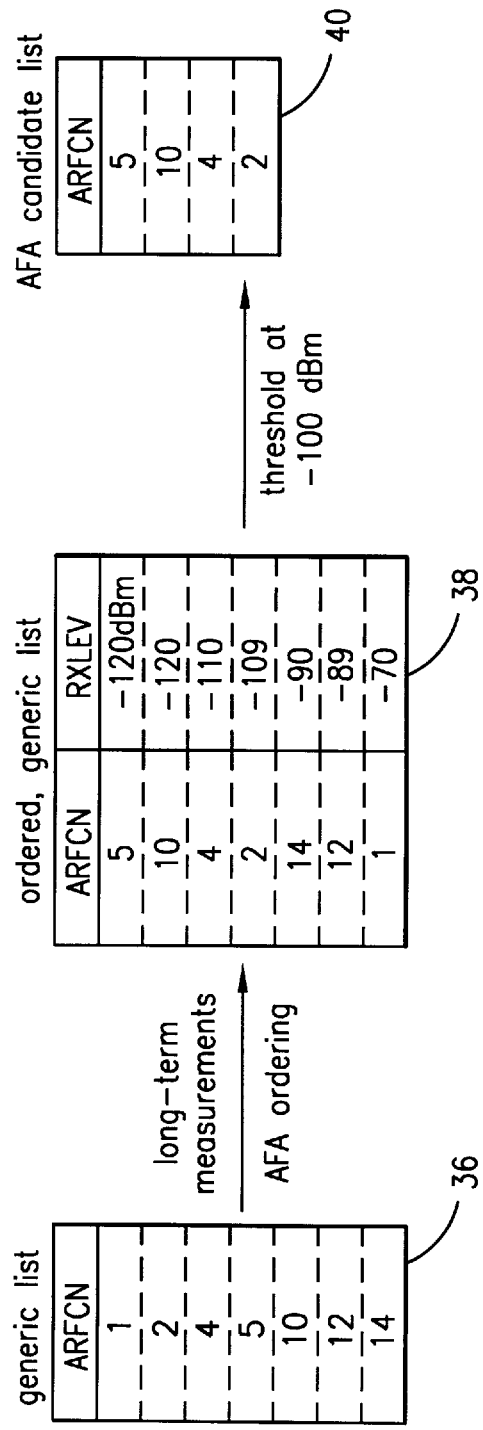
FIG. 3 illustrates a method for ordering candidate reusable frequencies in accordance with an initial ordering scheme of the present invention.

Uplink measurements on frequencies in the generic list 36, as shown in FIG. 3, can be performed directly in the private base station 20. Downlink measurements can either be performed in the private base station 20 or the private base station 20 can order a mobile station, such as the terminal 26, that is attached to the private base station 20, to carry out the downlink measurements and report them to the private base station. The latter is preferable as it is more cost-effective since the base stations 20 usually contain an uplink receiver only; an extra downlink receiver in the private base station 20 for downlink measurements would add extra costs, and can equally well be carried out by the downlink receiver of the mobile terminal 26. From the downlink measurements, the private radio system 24 can identify those particular frequencies that are used for control channels (in the GSM system, for example, the Broadcast Control Channel or BCCH directly indicates which frequencies in the cell and neighboring cells are used for control channels).

After processing the measurement results, the generic frequency list 36 can be ordered so that the least interfered channel is at the top and the most interfered channel is at the bottom. An example of a list 38 ordered by signal strength measurements is also shown in FIG. 3, where the strong signaled channels, causing the most interference, are at the bottom, and the weaker signaled channels are at the top. As noted, the control channels for the cell 12, as well as immediately adjacent cells, can be placed on the bottom of the ordered list 38, if they do not already end up there after the re-ordering process, since they are active all the time. In the measurement processing, there are a number of issues that can be taken into account to order the list. First, if the uplink and downlink frequencies are coupled, as in current cellular systems (there is a fixed frequency distance between uplink frequency and downlink frequency), then the uplink and downlink measurements should be combined in order to decide the placement in the ordered list 38. In this case, the downlink measurements can be weighted heavier than the uplink measurements since the downlink measurements are more reliable due to the larger cellular antenna height and antenna gain.

Figure 4:
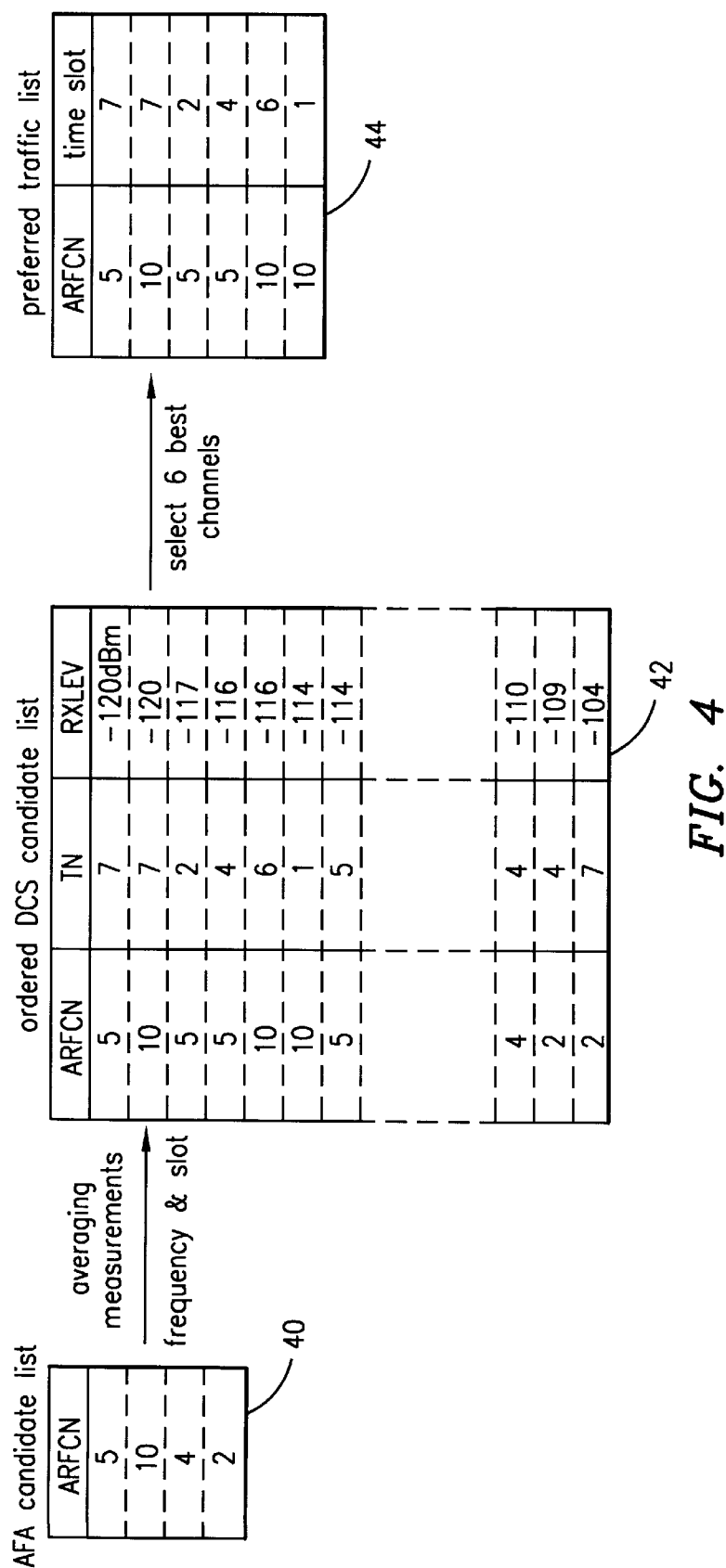
FIG. 4 illustrates a method for ordering the candidate reusable frequencies of FIG. 3 and channels in accordance with a subsequent ordering scheme of the present invention.

Second, the measurements are also advantageously used in an averaging process. For example, the time-of-day during which the measurements were obtained can be taken into account, thereby allowing one to put more weight on measurements performed during times when most cellular activity takes place (for example between 8 am and 6 pm or during lunch hours). The measurements are then averaged over a long time period (like several hours or days). After the generic list 36 has been so ordered 38, a subset with all the available and allowable frequencies listed at the top can be used as a candidate list 40 for channel allocation, as shown in FIGS. 3 and 4. This subset 40 preferably contains only frequencies which, based on the received signal levels or strengths (RXLEV) as added to the list, are safe to use by the private radio system 24 with minimal interference to or experiencing minimal interference from the overlaying cellular system. In particular, those frequencies with a measured interference above a predetermined (or variable) threshold are excluded in ascertaining the candidate list 40 frequencies.

The generic list 36, the ordered list 38, and the AFA candidate list 40 generated therefrom are shown in detail in FIG. 3. In this example, the RXLEV threshold of safe usage was set at –100 dBm. In this manner, a preferred candidate frequency is selected from the top of the candidate list 40, which in FIG. 3 is the frequency with ARFCN number 5.

Figure 5:
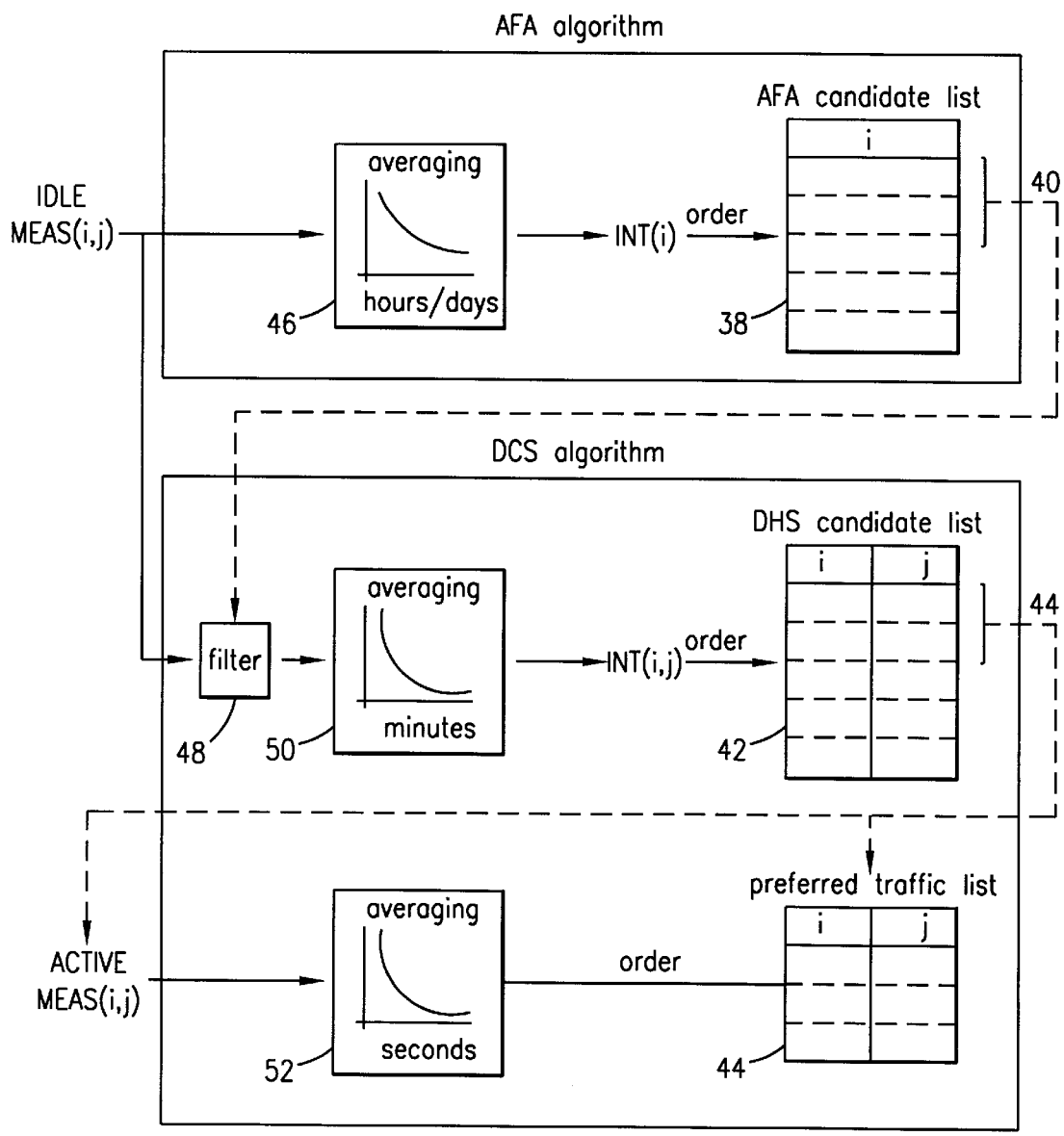
FIG. 5 further illustrates the method for ordering the frequencies and channels as set forth in FIGS. 3 and 4 of the present invention.

With reference now to FIG. 5, there is shown a representation of the algorithm or method of the present invention. In particular, FIG. 5 illustrates the first step of the present invention, i.e., the AFA algorithm. As discussed, the private base stations 20, when powered on, continuously perform RSSI measurements on the frequencies within the generic list 36, and also perform downlink measurements (or orders mobile terminals 26 registered to the particular base station 20 to do so). All of these idle measurements are averaged (irrespective of any particular time slot), generating an interference result per carrier, INT(i), where i represents a particular carrier frequency. As shown in FIG. 5, the averaging (box 46) is long-term in duration, i.e., over several hours or even days, and is done in idle not active mode. Furthermore, the averaging process is continuous, irrespective of whether there is a connection or not. From this long-term averaging, the ordered generic list 38 is formed with the least-interfered channels at the top. As discussed, a subset is selected from the top of the list and reserved as the AFA candidate list 40, which constitutes the carriers the private radio system 24 can use in case a connection must be made.

With the above-described AFA scheme, the problem for private radio systems 24 of interference to and from the cellular network is minimized since a candidate list or set 40 of frequencies is derived that fits in and slowly adapts to the reuse plan of the overlaying cellular system. However, since all private radio systems 24 co-located in a restricted area will experience the same cellular environment, they will all produce a similar list on set 40 of candidate frequencies. Therefore, the above method alone does not preclude the situation where two nearby private radio systems 24 within a cellular system select the same carrier frequency and thus interfere with each other. In order to minimize the potential for this mutual interference between nearby private radio systems 24, a second adaption procedure is required which responds to interference instantaneously.

Prior to allocating a channel from the afore-described candidate set 40, the private radio system performs more elaborate interference measurements on all or a limited number of the candidate channels carried by the frequencies indicated in the set or list 40. For a FDMA/TDMA system, for example, all slots of a carrier frequency are measured and averaged separately. The measurements are only averaged over a shorter time period (minutes or seconds). As discussed, the uplink measurements are performed in the private base station 20 and the downlink measurements are either performed in the private base station 20 or the base station orders the mobile station 26 to do interference measurements and give a measurement report. Based on the interference measurement results, the private base station 20 can then decide on the best channel to use which is the least interfered channel (where a channel is a frequency, a timeslot, or a combination of a frequency and a timeslot). This channel can then be allocated by the private base station 20 to be used as a traffic channel. This channel can be a frequency in a Frequency Division Multiple Access (FDMA) system, or a frequency/timeslot combination in a FDMA/TDMA system.

During the connection, periodic measurements on the received signal strength and the link quality in both the uplink and the downlink inform the private base station 20 of the current interference conditions. If the link quality becomes unacceptable, a handover to another, better channel can be initiated by the private base station 20. This second adaption scheme of the present invention is used dynamically during the entire connection and is referred to as a Dynamic Channel Selection (DCS) scheme. The DCS minimizes not only interference between private base stations, but will also minimize interference to the cellular system as well. The latter results from the fact that the private base station 24 initiates a handover if the interference level becomes too high, irrespective of whether it comes from another private radio system or from the cellular system. Therefore, if the AFA scheme is suboptimal or responds too slowly to a change in the cellular network, the DCS scheme will still guarantee that no interference between the private radio system 24 and the cellular system will occur. Indeed, the AFA and DCS schemes not only respond to co-channel interference, but also to adjacent-channel interference. The interference measured can equally well result from spill over from a strong adjacent channel. The adaptive scheme of the present invention will take care of this kind of interference as well.

FIG. 4 illustrates the afore-described DCS procedure assuming a FDMA/TDMA system like GSM or D-AMPS.

All channels (frequency/timeslot combination in this example where ARFCN indicates the frequency and TN the timeslot number) are measured. Then the ARFCN/TN list is ordered according to the measured RXLEV to form an ordered candidate list 42. From this ordered list 42, the top N channels (N=6 in the example of FIG. 5) are taken to be used in the traffic (or active) mode, forming a preferred traffic list 44. During the connection, the private radio system 24 only uses channels from the preferred traffic list 44.

With reference again to FIG. 5, the second step of the present invention, i.e., the DCS algorithm, is described in more detail. The AFA candidate list 40 is used in a filter 48 to let pass only those idle measurements which relate to the frequencies as found in the AFA candidate list. It should be understood that both the frequency and timeslot (i and j) measurements may also be used by the AFA process, but all measurements on the same frequency are averaged together. With reference again to the DCS algorithm, the measurements on the carriers and the time slots, i.e., the channels, are averaged over a medium time duration, e.g., over a period of minutes (box 50). The average measurements results, INT(i, j), are then determined. From this medium-term averaging, the ordered DCS list 42 is formed. It should be understood that the ordered DCS list 42 is present whether or not a connection has been established. Furthermore, the list 42 is constantly updated and re-ordered depending on the results of the medium-term averaging (box 50).

If a connection is then established, the top (N) channels from the ordered list 42 are selected to form the preferred traffic list 44. During the connection, active measurement (active mode) are performed on these channels alone and they are short-term averaged, i.e., over a period of seconds (box 52), and re-ordered accordingly. It should be understood, however, that unlike the averaging done in box 50, where the list members can be redetermined and different members substituted, the averaging and any re-ordering done in box 52 is solely within the preferred traffic list 44. Measurements are done only on the channels as found in the preferred traffic list 44 during the active or connection state. In order to prevent the channels from jumping around in the preferred list 44, a margin is defined in that reordering is necessary only if the interference levels differ more than the margin.

Accordingly, it should be understood that the creation of the AFA candidate list is done by long-term averaging (box 46), the creation of the DCS candidate list 42 is done by medium-term averaging (box 50), and the creation of the DCS preferred candidate or traffic list 44 is done by short-term averaging (box 52). The aforementioned averaging is preferably a moving-average process or an exponential-forget averaging. Further, although the averaging can be done in the log domain, i.e., averaging in dBm, averaging is preferably carried out in the linear domain, i.e., averaging in mW, in order to respond quickly to increasing interference levels.

It should be understood that the aforedescribed averaging measurements are taken in the base station and mobile terminal receiver at a certain carrier frequency for a certain duration of time. The received signal strength indications (RSSI) samples are then averaged over the respective time window. Usually, the RSSI is derived from log amplifiers which give a measurement in the log domain, i.e., dBm. Accordingly, the measurement result over the respective time window provides one measurement sample: if the window is one slot, the measurement represents the instantaneous interference level for that slot; if the time window covers an entire TDMA frame, the measurement result represents the interference level for that carrier. In any event, the measurement samples are collected and then processed accordingly. As discussed, although dBm values can be averaged, mW values (linear averaging) are preferred since this gives a faster response to increasing interference levels. The time constant for averaging in case of an exponential-forget process, or the average window in case of a moving-average process, is set depending on whether a short-term, medium-term, or long-term average is desired.

Exponential-forget averaging works as follows:

$$AVE[k] = \lambda \cdot AVE[-1] + (1-\lambda) \cdot MEAS[k]$$

where AVE represents the averaged measurement value at time K and MEAS is the new measured value. The parameter $\lambda$ is the time constant which determines the effective average period. The moving-average process is:

$$AVE[k] = \sum_{i=0}^{M-1} MEAS[k-i]/M$$

where M is the number of samples to average over.

It may happen that a sudden interfering signal wipes out the entire communication between a private base station 20 and a mobile station 26. In that case, the private base 20 station is unable to transfer handover information to the mobile station 26 over the associated signaling channel. Without countermeasures, the call would be dropped due to this failure. However, the DCS scheme of the present invention preferably provides a so-called "escape channel" channel to which both the private base station 20 and the mobile station 26, forming a connection, will jump in case link failure is experienced. This escape channel can be another frequency, another slot, or another frequency/slot combination. This escape channel can, for example, be the second best channel in the preferred traffic list 44, that is, the channel least interfered but one, which in FIG. 4 is the frequency with ARFCN number 10 in timeslot 7. This escape channel can, of course, change during the call due to changing interference conditions. Therefore, the escape channel is preferably periodically updated by the private base station 20 and then communicated from the private base station 20 to the mobile station 26. In case a loss of connection is experienced, both the private base station 20 and the mobile station 26 may then jump to the escape channel according to the last acknowledged update, and try to continue the connection there.

The previous description is of preferred embodiments for implementing the invention, and the scope of the invention should not necessarily be limited by this description. The scope of the present invention is instead defined by the following claims.

What is claimed is:

1. A method for allocating a least-interfered communication channel between a private radio system and a cellular terminal, said private radio system and said cellular terminal being located within an area covered by said cellular system, where said private radio system and said cellular system share channels, said method comprising the steps of:

determining, within said private radio system, a first set of candidate channels for use by said private radio system within said area;

ordering said first set of candidate channels into an ordered set pursuant to a first interference measurement, said first interference measurement being associated with the amount of interference encountered by the respective channels of said first set within said area;

determining, within said private radio system, a second set of candidate channels pursuant to a second interference measurement, said second set being a subset of said first set of candidate channels, said second interference measurement being associated with the amount of interference encountered by the respective channels of said second set within said area;

performing averaging measurements on a plurality of candidate channels within said second set;

ordering said plurality of candidate channels within said second set into an ordered set pursuant to said second interference measurement; and selecting one of said plurality of candidate channels within said second set as the least-interfered communication channel for use by said private radio system.

2. The method according to claim 1, wherein said step of determining said first set of candidate channels comprises:

performing signal strength measurements, within a mobile station in communication with said private radio system, on channels between said mobile station and said private radio system;

transferring said signal strength measurements to said private radio system; and determining, within said private radio system, said first set of candidate channels.

3. The method according to claim 2, wherein said first interference measurement in said step of ordering said first set of candidate channels comprises weighing portions of said signal strength measurements more heavily during a particular time of the day.

4. The method according to claim 2, wherein said first interference measurement in said step of ordering said first set of candidate channels comprises combining a plurality of uplink and downlink signal strength measurements between said private radio system and said cellular system.

5. The method according to claim 4, wherein said plurality of downlink signal strength measurements are weighed more heavily in the combination.

6. The method according to claim 1, wherein said averaging measurements in said step of performing are performed over a range of about one to five seconds.

7. The method according to claim 1, further comprising: updating said second set of candidate channels pursuant to changes within the private radio system.

8. The method according to claim 1, further comprising: handing over said least-interfered communication channel to another channel when the quality of said least-interfered communication channel deteriorates, said another channel selected in accordance with said method.

9. The method according to claim 8, wherein said another channel is at a frequency different from said communication channel.

10. The method according to claim 8, wherein said another channel is in a timeslot different from said least-interfered communication channel.

11. The method according to claim 1, further comprising: updating said first set of candidate channels pursuant to changes within the cellular system.

12. The method according to claim 1, wherein said step of determining said second set of candidate channels comprises:

performing averaging measurements, within a mobile station in communication with said private radio system, on channels between said mobile station and said private radio system;

transferring said averaging measurements to said private radio system; and determining, within said private radio system, said second set of candidate channels.

13. The method according to claim 1, wherein, upon loss of communication between said private radio system and a mobile terminal, said step of selecting selects an escape communication channel.

14. The method according to claim 13, wherein said escape communication channel is the second least-interfered communication channel within said second set.

15. In a communication system having a cellular system and a private radio system, said private radio system being located within an area covered by said cellular system, circuitry within said private radio system for allocating a least-interfered communication channel for said private radio system where said private radio system and said cellular system share channels, said circuitry comprising:

a first determining means, within said private radio system, for determining a first set of candidate channels for use by said private radio system within said area, said first set of candidate channels being determined pursuant to a first interference averaging measurement;

a first ordering means for ordering said first set of candidate channels into an ordered set pursuant to said first interference averaging measurement, said first interference averaging measurement being associated with the amount of interference encountered by the respective channels of said first set within said area;

a second determining means, within said private radio system, for determining a second set of candidate channels pursuant to a second interference averaging measurement, said second set being a subset of said first set of candidate channels, said second interference averaging measurement being associated with the amount of interference encountered by the respective channels of said second set within said area;

a second ordering means for ordering said second set of candidate channels into an ordered set pursuant to said second interference averaging measurement; and selecting means for selecting a given candidate channel within said ordered second set as the least-interfered communications channel for use by said private radio system.

16. The circuitry according to claim 15, wherein said first determining means receives signal strength measurements, from a mobile station in communication with the private radio system, of a plurality of channels between said mobile station and said private radio system, and determines said first set of candidate channels from said plurality of channels.

17. The circuitry according to claim 15, wherein said second determining means is within a mobile station in communication with the private radio system.

18. The communication system according to claim 15, wherein, upon loss of communication between said private radio system and a mobile terminal, said selecting means selects an escape communication channel.

19. The communication system according to claim 18, wherein said escape communication channel is the second least-interfered communication channel within said second set.

20. A private base station within a private radio system, said private base station being in communication with a plurality of mobile phones, said private radio system being located within an area covered by a cellular system, circuitry within said private base station for allocating a least-interfered traffic channel between a given one of said plurality of mobile phones and said private base station, said circuitry comprising:

a first channel selection means for selecting a first set of candidate channels for use by said private radio system within said area pursuant to a first interference averaging measurement, said first interference averaging measurement being associated with the amount of interference encountered by the respective channels of said first set within said area;

a second channel selection means for selecting a second set of candidate channels for use by said private radio system within said area of the cellular system pursuant to a second interference averaging measurement, said second set being a subset of the first set, said second interference averaging measurement being associated with the amount of interference encountered by the respective channels of said second set within said area; and selecting means for selecting a given one of said candidate channels within the second set as the least-interfered traffic channel.

21. The private base station according to claim 20, wherein said first set of candidate channels are selected from a generic list of candidate channels within said private base station.

22. The private base station according to claim 21, wherein said generic list is placed within said private base station at the time of manufacture of said private base station.

23. The private base station according to claim 21, wherein said generic list is placed within said private base station at the time of installation of said private base station within said area.

24. The private base station according to claim 21, wherein said generic list is forwarded to the private base station via a wireline connection to a remote operator.

25. The private base station according to claim 21, wherein said generic list is forwarded to the private base station via a wireless communication.

26. The private base station according to claim 25, wherein said generic list is forwarded to the private base station via a short message service communication.

27. The private base station according to claim 25, wherein said generic list is forwarded to the private base station via a communications link with one of said mobile phones.

28. The private base station circuitry according to claim 20, wherein said first channel selection means further comprises a first ordering means for ordering the respective candidate channels within said first set into an ordered set pursuant to the amount of interference encountered by the respective candidate channels of said first set within said area.

29. The private base station circuitry according to claim 28, wherein said first channel selection means further comprises averaging means for averaging, pursuant to said first interference averaging measurement, the amount of interference encountered by the respective channels of said first set over a given period of time.

30. The private base station circuitry according to claim 29, wherein said averaging means includes uplink measurements of a plurality of said respective channels.

31. The private base station circuitry according to claim 30, wherein said averaging means also includes downlink measurements of a plurality of said respective channels, said uplink and downlink channels being coupled.

32. The private base station circuitry according to claim 31, wherein said downlink channels are weighted by said averaging means more heavily than said uplink channels.

33. The private base station circuitry according to claim 29, wherein said averaging means includes downlink measurements of a plurality of said respective channels.

34. The private base station circuitry according to claim 33, wherein said downlink measurements are carried out in a given one of said mobile phones and forwarded to said private base station.

35. The private base station circuitry according to claim 29, wherein said averaging means comprises an exponent-forget a averaging algorithm.

36. The private base station circuitry according to claim 28, wherein said first ordering means reorders the respective candidate channels within said first set pursuant to subsequent amounts of interference encountered by said respective candidate channels within said area.

37. The private base station circuitry according to claim 36, wherein said first ordering means reorders said first set in accordance with interference measurements forwarded by a given one of said mobile phones.

38. The private base station circuitry according to claim 36, wherein said reordering of said first ordering means is continuous, said reordering between two of said candidate channels within said first set being performed if the difference in interference measurements for said two candidate channels is greater than a first threshold.

39. The private base station circuitry according to claim 38, wherein said first threshold is predetermined.

40. The private base station circuitry according to claim 38, wherein said first threshold is variable.

41. The private base station circuitry according to claim 20, wherein said first channel selection means excludes from said first set a plurality of control channels utilized within said area.

42. The private base station circuitry according to claim 20, wherein said second channel selection means further comprises a second ordering means for ordering the respective candidate channels within said second set into another ordered set pursuant to the amount of interference encountered by the respective candidate channels of said second set within said area.

43. The private base station circuitry according to claim 42, wherein said second channel selection means further comprises averaging means for averaging, pursuant to said second interference averaging measurement, the amount of interference encountered by the respective channels of said second set over a given period of time.

44. The private base station circuitry according to claim 43, wherein said averaging means includes uplink measurements of a plurality of said respective channels.

45. The private base station circuitry according to claim 44, wherein said averaging means also includes downlink measurements of a plurality of said respective channels, said uplink and downlink channels being coupled.

46. The private base station circuitry according to claim 45, wherein said downlink channels are weighted by said averaging means more heavily than said uplink channels.

47. The private base station circuitry according to claim 43, wherein said averaging means includes downlink measurements of a plurality of said respective channels.

48. The private base station circuitry according to claim 47, wherein said downlink measurements are carried out in a given one of said mobile phones and forwarded to said private base station.

49. The private base station circuitry according to claim 43, wherein said averaging means comprises an exponential-forget averaging algorithm.

50. The private base station circuitry according to claim 20, wherein said first channel selection means excludes from said first set a plurality of control channels utilized within said area.

51. The private base station circuitry according to claim 20, wherein if, during a communications link between said private base station and a given one of said mobile phones on a given traffic channel, said link is severed, said second channel selection means selects another of said candidate channels within the second set as the least-interfered traffic channel.

52. The private base station circuitry according to claim 51, wherein said another candidate channel is determined prior to said severing and stored within said private base station and said given mobile phone.

53. The private base station circuitry according to claim 20, wherein, during a communications link between said private base station and a given one of said mobile phones on a given traffic channel, said link is severed whenever the amount of interference encountered by said given traffic channel within said area of the cellular system exceeds an interference margin, and said second channel selection means selects another of said candidate channels within the second set as the least-interfered traffic channel.

54. The private base station circuitry according to claim 20, wherein the interference encountered by the respective candidate channels of said first and second sets within said area is interference from a plurality of channels of said cellular system.

55. The private base station circuitry according to claim 54, wherein the interference encountered within said area further includes interference from a plurality of channels of other private radio systems.

56. The private base station circuitry according to claim 20, wherein the interference encountered by the respective candidate channels of said first and second sets within said area is interference from a plurality of channels of other private radio systems.

57. The private base station circuitry according to claim 20, wherein said candidate channels comprise frequencies.

58. The private base station circuitry according to claim 57, wherein said cellular system is a Frequency Division Multiple Access system.

59. The private base station circuitry according to claim 57, wherein said candidate channels comprise a frequency and timeslot combination.

60. The private base station circuitry according to claim 59, wherein said cellular system is a member of the group consisting of a Frequency Division Multiple Access system, a Time Division Multiple Access system and a combination thereof.

61. The private base station circuitry according to claim 20, wherein each of said candidate channels are associated with a respective Absolute Radio Frequency Channel Number.

* * * * *

UNITED STATES PATENT AND TRADEMARK OFFICE
CERTIFICATE OF CORRECTION

PATENT NO. : 5,884,145
DATED : Mar. 16, 1999
INVENTOR(S) : Haartsen

It is certified that error appears in the above-identified patent and that said Letters Patent is hereby corrected as shown below:

Column 10, line 13  Replace "[-1]"
With --[k-1]--

Column 14, lines 13-14  Replace "exponent-forget a"
With --exponential-forget--

Signed and Sealed this

Twentieth Day of July, 1999

Attest:

Q. TODD DICKINSON

Attesting Officer

Acting Commissioner of Patents and Trademarks